United States Patent
Criel et al.

(10) Patent No.: US 8,658,079 B2
(45) Date of Patent: Feb. 25, 2014

(54) PROCESS FOR MANUFACTURING A FUEL TANK

(75) Inventors: Bjorn Criel, Sint-Martens-Lennik (BE); David Hill, Commerce Township, MI (US)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 20 days.

(21) Appl. No.: 13/143,095

(22) PCT Filed: Jan. 14, 2010

(86) PCT No.: PCT/EP2010/050410
§ 371 (c)(1), (2), (4) Date: Jul. 1, 2011

(87) PCT Pub. No.: WO2010/081853
PCT Pub. Date: Jul. 22, 2010

(65) Prior Publication Data
US 2011/0266723 A1    Nov. 3, 2011

Related U.S. Application Data

(60) Provisional application No. 61/145,630, filed on Jan. 19, 2009.

(30) Foreign Application Priority Data

Jan. 19, 2009 (FR) ..................................... 09 50282
Jun. 23, 2009 (FR) ..................................... 09 03043

(51) Int. Cl.
*B29C 49/20*   (2006.01)

(52) U.S. Cl.
USPC ............ 264/526; 264/523; 264/531; 264/516

(58) Field of Classification Search
None
See application file for complete search history.

(56) References Cited

U.S. PATENT DOCUMENTS

| | | | |
|---|---|---|---|
| 4,952,347 | A | 8/1990 | Kasugai |
| 6,860,398 | B2 | 3/2005 | Potter et al. |
| 2001/0015513 | A1 | 8/2001 | Schaftingen et al. |
| 2005/0205156 | A1 | 9/2005 | Ganachaud et al. |
| 2007/0290414 | A1* | 12/2007 | Criel .............................. 264/531 |
| 2008/0078761 | A1 | 4/2008 | Berchert et al. |
| 2009/0152263 | A1 | 6/2009 | Criel et al. |

FOREIGN PATENT DOCUMENTS

| | | |
|---|---|---|
| EP | 1110697 A2 | 6/2001 |
| EP | 1894702 A2 | 3/2008 |
| FR | 2877256 A1 | 5/2006 |
| GB | 1410215 A | 10/1975 |

(Continued)

OTHER PUBLICATIONS

U.S. Appl. No. 12/997,404, filed May 11, 2011, Bjorn Criel, et al.

*Primary Examiner* — Monica Huson
(74) *Attorney, Agent, or Firm* — Oblon, Spivak, McClelland, Maier & Neustadt, L.L.P.

(57) ABSTRACT

Process and device for manufacturing a plastic fuel tank equipped with at least one communication component, by molding a parison using a mold comprising two impressions and a core, said process comprising the pressing of the parison against the impressions and formation of a pocket in this parison, the communication component being fastened in this pocket by welding of at least one portion of its side wall to at least one portion of the side wall of the pocket.

15 Claims, 13 Drawing Sheets

(56) References Cited

FOREIGN PATENT DOCUMENTS

| | | |
|---|---|---|
| JP | 1294439 A | 11/1989 |
| WO | WO 2004024487 A1 | 3/2004 |
| WO | WO 2005085660 A2 | 9/2005 |
| WO | WO 2006008308 A1 | 1/2006 |
| WO | WO 2006095024 A1 | 9/2006 |
| WO | WO 2007000454 A1 | 1/2007 |
| WO | WO 2010006900 A1 | 1/2010 |

* cited by examiner

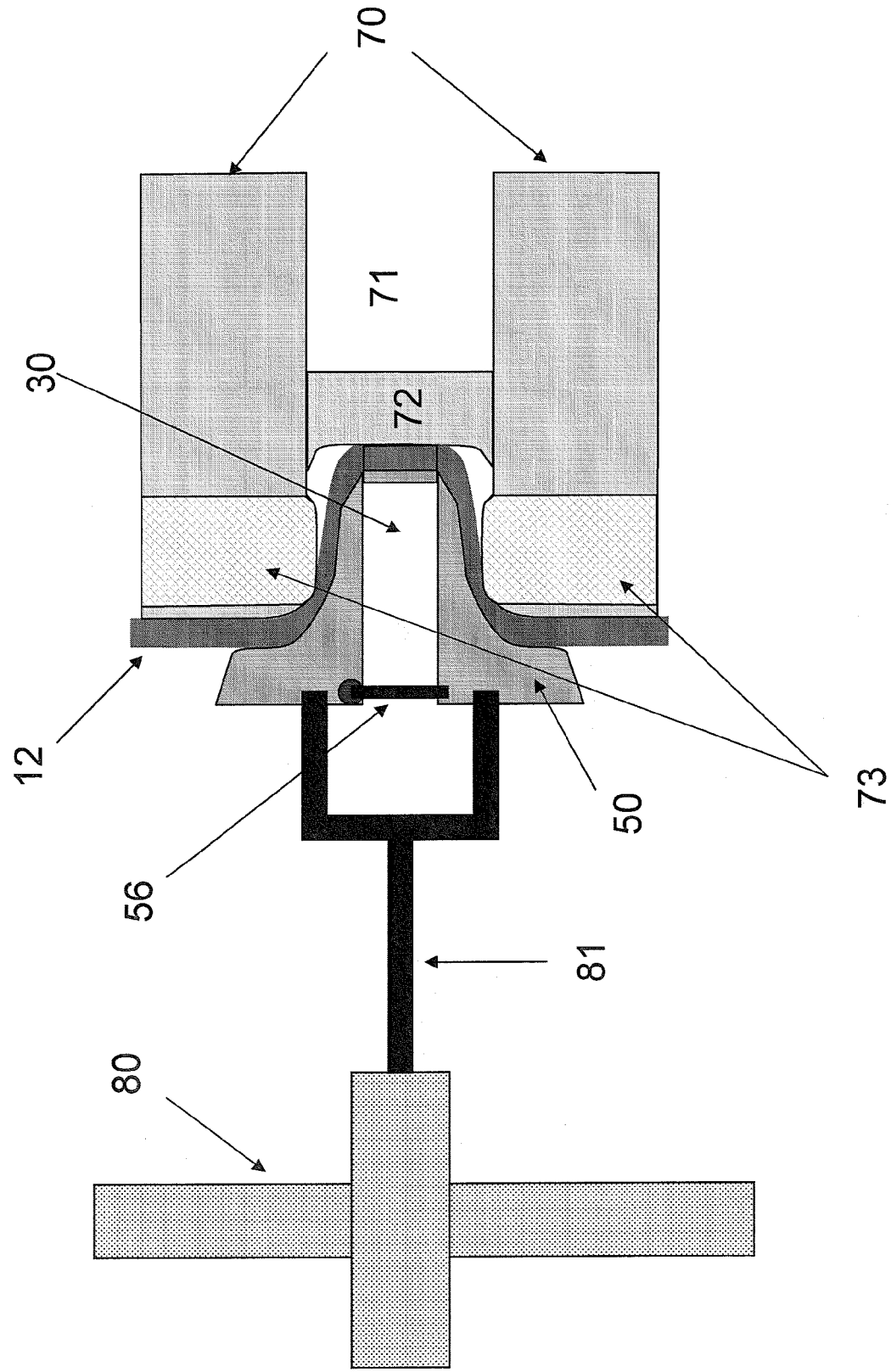
Fig. 8.1

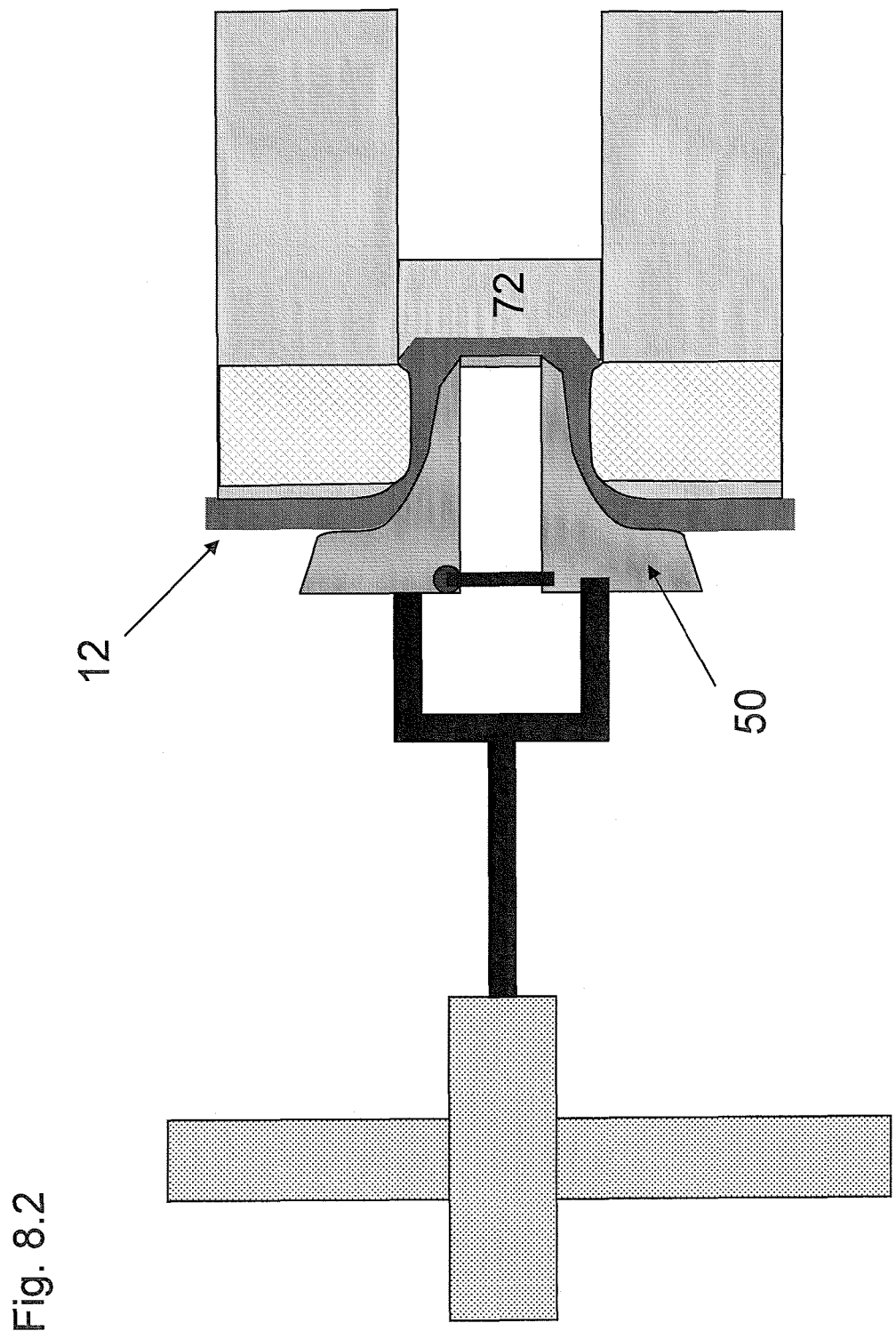
Fig. 8.2

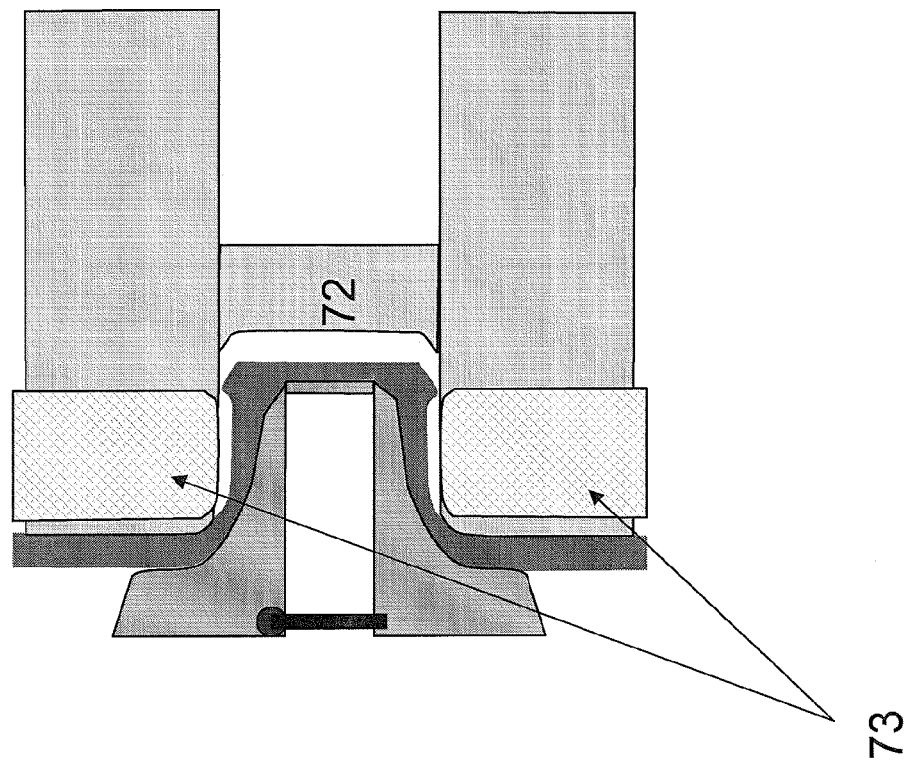
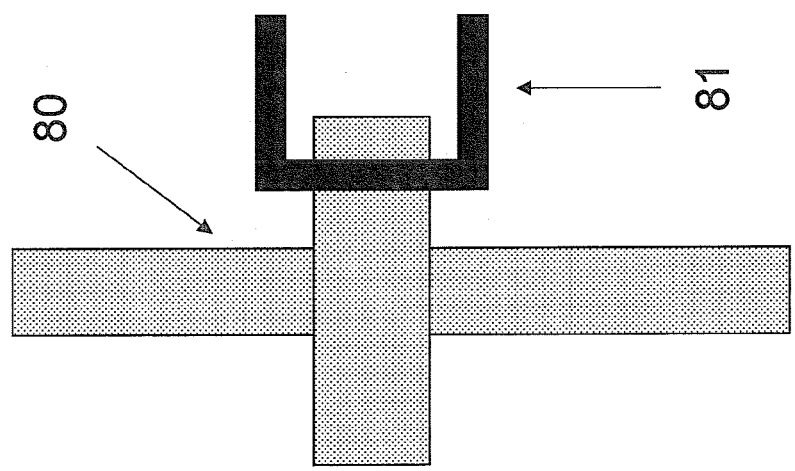
Fig. 8.3

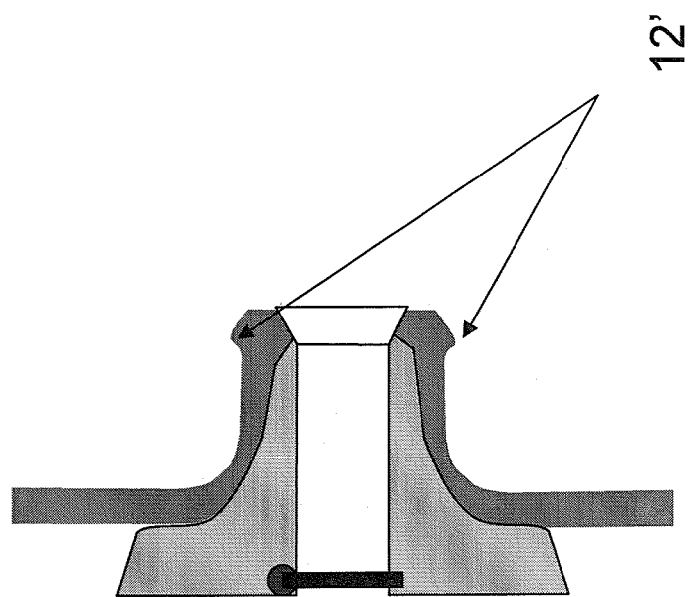
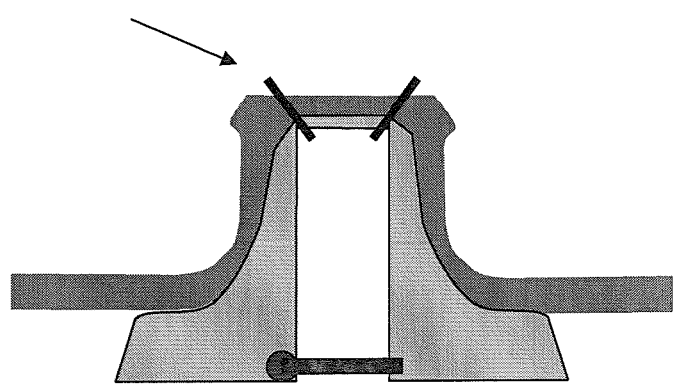
Fig. 8.4

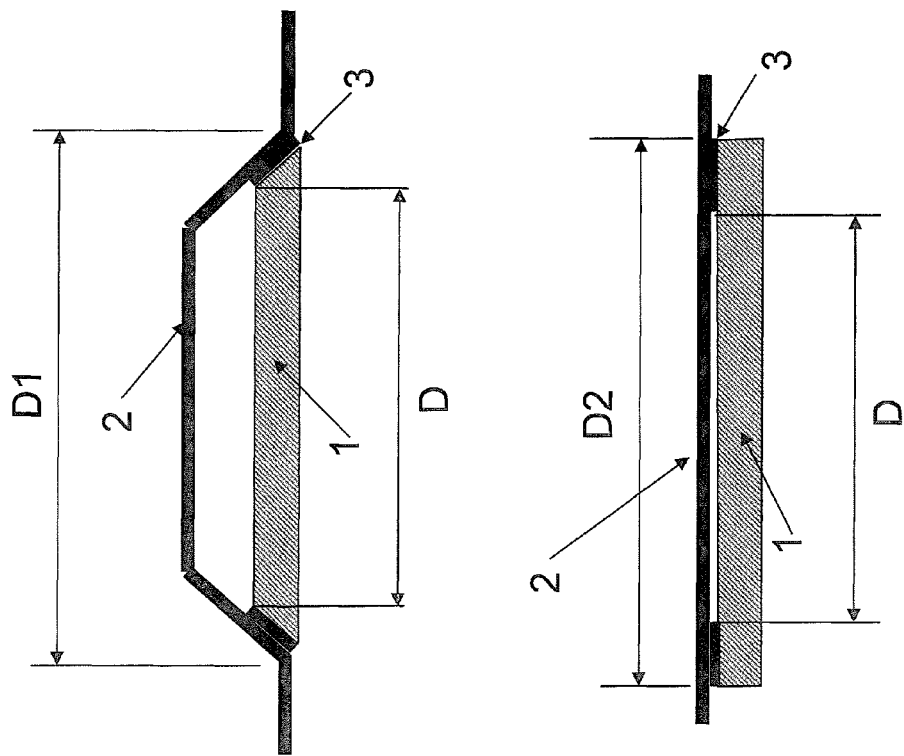

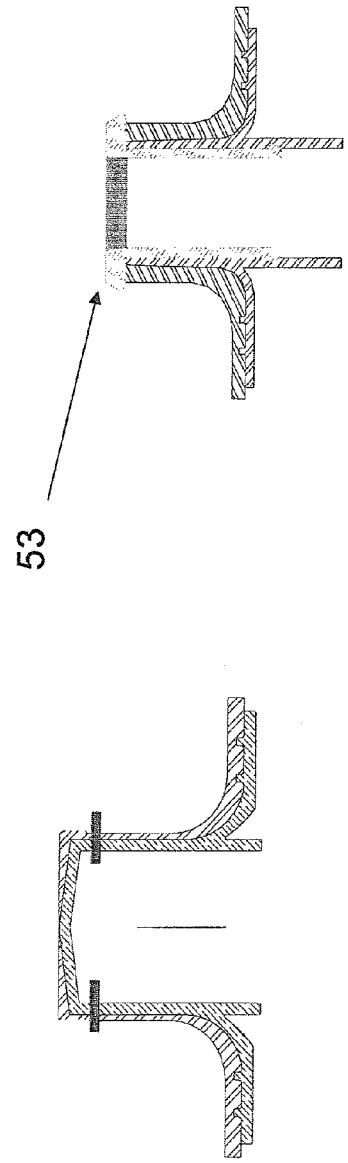
Fig. 10.1
Fig. 10.2
Fig. 11.1
Fig. 11.2

PROCESS FOR MANUFACTURING A FUEL TANK

CROSS-REFERENCE TO RELATED APPLICATIONS

The present application is a U.S. national stage entry under 35 U.S.C. §371 of International Application No. PCT/EP2010/050410 filed Jan. 14, 2010, which claims priority to French Application No. 09.50282, filed Jan. 19, 2009, to French Application No. 61/145,630, filed Jan. 19, 2009, and to French Application No. 09.03043, filed Jun. 23, 2009, these applications being herein incorporated by reference in their entirety for all purposes.

TECHNICAL FIELD OF THE INVENTION

The present invention relates to a process and device for manufacturing a plastic fuel tank equipped with a component.

BACKGROUND

Fuel tanks on board vehicles of various kinds generally have to meet sealing and permeability standards in relation to the type of use for which they are designed and the environmental requirements that they have to satisfy. At the present time, both in Europe and throughout the world, there is a substantial tightening of the requirements regarding the limitation of pollutant emissions into the atmosphere and into the environment in general.

To limit these emissions, care is taken in particular to position the components (ventilation lines, valves, baffles, stiffeners, etc.) inside the tank and/or the fill pipe (see in particular application WO 2004/024487 in the name of the Applicant). However, when these elements are fastened to the tank after it has been molded, it is generally necessary to make at least one opening in the tank so as to be able to introduce these elements into the tank and to fasten them thereto. Hence there may be potential sealing and permeability problems near this opening. The leaktight closure between an element and the tank is conventionally achieved with the aid of the compression of a seal, which seal is however a significant source of permeability. Furthermore, this type of closure is generally performed manually on the production line, which creates labour costs and may generate scrap due to human error.

Several years ago the Applicant therefore developed a process of initially molding a cut parison (cut into 2 sections) in order to be able to introduce thereinto and fasten thereto components during the actual molding of the tank and to thus avoid piercing openings (see patent EP 1 110 697 in the name of the Applicant).

This process has since been the subject of several improvements targeting particular means for fastening these components: see in particular applications WO 2006/008308 (fastening of components by rivet punching), WO 2006/095024 (fastening of ventilation lines that have a part that can be deformed due to the presence of a bend that is stretched during the attachment of these lines to the parison) and WO 2007/000454 (fastening of components according to an ideal layout and in particular, as regards the ventilation lines, while avoiding the formation of siphons).

These improvements have been able to be made due to the use of a core, i.e., a part of suitable size and shape for being able to be inserted between the impressions of the mold when the parison is located therein and to fasten thereto the components inside the tank without the edges of the parison being welded (since the core must be removed before the final molding of the tank, a step during which the welding of the parison sections is carried out). Such a part (core) is, for example, described in patent GB 1 410 215, the content of which is for this purpose incorporated by reference into the present application.

In particular, the aforementioned application WO '454 describes a process that uses such a core in order to position on the parison at least one portion of a component intended to pass through the wall of the tank. The variants illustrated in this application require either a manual assembly step after all (with the aforementioned risks of error and handling costs), or the deformation of the parison by piercing in order to allow a portion of the component to pass through, hence a risk of damaging said parison.

U.S. Pat. No. 6,860,398, which relates to conventional processes (twin-sheet thermoforming or blow-molding of a single parison) for manufacturing a tank, also describes a method for fastening a component (fitting) during this process and which consists in sandwiching the sheet/parison between the outer and inner parts of said fitting, which is in fact made of two parts. Such a process is also capable of damaging said sheet/parison (indeed, the EVOH layer risks being very greatly reduced in thickness and, in an extreme case, breaking and thus no longer ensuring the impermeabilization of the filler neck) and also involves the fastening of two parts, which is complicated and costly.

Moreover, the neck that is described in this application is intended to connect a sleeve thereto using a clamp collar. At the other end of this sleeve the fill pipe is then connected. The material used for this sleeve is typically of low permeability. Thus, the permeability of the assembly between the filler neck and the sleeve is characterized by the distance between the EVOH layer in the filler neck and the sleeve. It is then therefore advantageous to position the EVOH layer as close as possible to the sleeve. However, in the variant that is the subject of this application, this distance is increased by the part 22 of FIG. 6.

SUMMARY OF THE INVENTION

The object of the present invention is to provide a process for manufacturing a fuel tank in which the installation of a component is rapid, precise and has fewer risks of leaks and of scrappage than in the processes of the prior art. This objective is achieved by a process according to Claim 1.

For this purpose, the invention relates to a process for manufacturing a plastic fuel tank equipped with at least one communication component intended to communicate with the outside of the tank and which has a side wall, by molding a parison using a mold comprising two impressions and a core, said process comprising the following steps:
   introduction of a parison into the mold impressions;
   introduction of a core inside the parison, said core having first been fitted with the at least one component;
   closure of the mold so that the impressions come into leaktight contact with the core;
   pressing of the parison against the impressions by blowing through the core and/or applying a vacuum behind the impressions;
   installation of the at least one component on the inner wall of the parison;
   opening of the mold in order to withdraw the core;
   final molding of the parison by blow-molding and/or thermoforming; and
   cutting the skin of the tank so as to allow access to the communication component, according to which:
- the mold impressions are provided with a hollow which, when pressing the parison against said impressions, gives rise, at least partly, to the formation of a pocket having a shape complementary to that of the hollow and comprising a bottom and a side wall;
- the installation of the communication component comprises its fastening, in this pocket, by welding of at least one portion of its side wall to at least one portion of the side wall of the pocket.

By virtue of the process according to the invention, a communication component can be mounted inside the tank rapidly, with great precision and without risks of leakage. Installation of at least one portion of the communication component after blow-molding, conventionally performed by hand, is no longer necessary, thus eliminating a significant source of errors. Similarly, due to the formation of a pocket for receiving the component, the risk of deterioration of the parison by piercing is eliminated. Finally, this pocket makes it possible to use the side wall of the component for fastening it to the parison, which in certain cases limits/facilitates machining (cutting of the skin to allow access to the component). The precise and reproducible installation of the communication component leads to a reduction in the production costs and an increase in quality of the fuel tank manufactured. After molding the tank, cutting the skin of the tank allows access to the communication component and thus makes it possible to easily obtain, through the communication component, access to the inside of the tank. It should be noted that this machining must be performed on the tank already molded with its pocket and the component in said pocket, but that this machining/cutting can be performed while the tank is till in the mold: see for instance the embodiment according to FIGS. 12-15 attached.

BRIEF DESCRIPTION OF THE DRAWINGS

Other particular aspects and features of the invention will become apparent from the description of a few advantageous embodiments presented below, by way of illustration, with reference to the appended drawings which show:

FIG. 8 illustrates schematic views (FIGS. 8.1, 8.2, 8.3, 8.4) of certain steps of a process for manufacturing a tank according to one variant of the invention involving the fastening of a filler neck;

FIG. 9 shows a diagram illustrating a preferred variant of the invention where the component is a mounting plate having a bevelled lateral edge;

FIG. 10 illustrates schematic views (FIGS. 10.1 and 10.2) of a filler neck fastened by a process according to one variant of the invention;

FIG. 11 illustrates schematic views (FIGS. 11.1 and 11.2) of two steps of a process according to another variant of the invention.

DETAILED DESCRIPTION OF THE PREFERRED EMBODIMENTS

Figure 1:
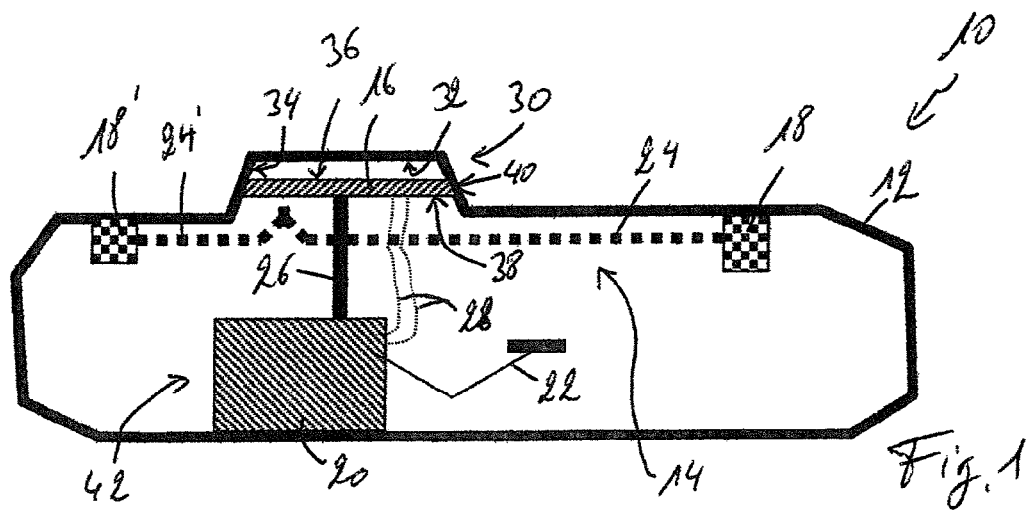
FIG. 1 illustrates a schematic cross-sectional view through a fuel tank resulting from the process according to a first embodiment of the invention, before cutting.

The term "fuel tank" is understood to mean an impermeable tank that can store fuel under various and varied environment and usage conditions. An example of this tank is that with which motor vehicles are fitted.

The fuel tank according to the invention is made of plastic.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a material that is a barrier to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulfonation) for the purpose of making it impermeable to the fuel.

The tank according to the invention preferably comprises an EVOH-based barrier layer located between the HDPE-based outer layers.

It should be noted that the use of the process according to the invention is particularly advantageous when the tank comprises such a layer that is a barrier to liquids and/or gases. During the fastening of the component to the parison, the structure of the parison remains unchanged, i.e., none of the various layers of material are destroyed/damaged during the fastening. Hence, the layer that is a barrier to liquids and/or gases also extends beyond the fastening point and thus makes it possible to guarantee the impermeability of the tank in the region of the component.

According to the invention, the tank is produced by molding a parison. The term "parison" is understood to mean a preform, which is generally extruded and is intended to form the wall of the tank after molding to the required shapes and dimensions. This preform does not necessarily have to be a one-part preform.

Thus, advantageously, the parison is in fact made up of two separate parts, which may be two sheets, for example. However, these parts preferably result from cutting one and the same extruded tubular parison as described in the aforementioned application EP 1 110 697, the content of which is, for this purpose, incorporated by reference in the present application. According to this variant, once a single parison has been extruded, this parison is, for example, cut over its entire length, along two diametrically opposed lines, to obtain two separate parts (sheets).

By comparison with the molding of two separately extruded sheets, the thickness of which is constant, this approach makes it possible to use parisons of varying thickness (that is to say in which the thickness is not constant along their length), obtained using a suitable extruding device (generally an extruder equipped with a die and a punch, the position of which is adjustable). Such a parison takes account of the reduction in thickness that occurs during molding at certain points on the parison, as a result of non-constant levels of deformation of the material in the mold.

After a parison has been molded in two parts, these parts generally form the lower and upper walls respectively of the fuel tank, each having an inner surface (pointed towards the inside of the tank) and an outer surface (pointed towards the outside of the tank).

The mold used in the process according to the invention comprises a core as defined previously and two impressions that are intended to be in contact with the outer surface of the parison, the parison being molded by blow-molding (pressing the parison against these impressions using a pressurized gas injected into the parison) and/or by thermoforming (drawing a vacuum behind the mold impressions).

The expression communication component is understood to mean a component intended to create a communication between the inside and the outside of the tank. Such a communication component may comprise a filler neck, a ventilation pipe, an OBD line, an electrical connector or a mounting plate (i.e., an interface part, generally in the form of a plate that is preferably circular and that comprises at least one orifice (for example to supply the engine with fuel, to supply the pump with electricity, etc.)).

When the communication component comprises a mounting plate, the latter is advantageously part of a previously assembled components unit that comprises a plurality of components.

The components of the components unit are preferably chosen from a pump, a gauge and a ventilation system. The mounting plate advantageously comprises a ventilation passage connected to the ventilation system; and/or a fuel passage connected to the pump; and/or a passage for electrical conductors connected to the pump and/or the gauge.

By passing the pipes, cables and conductors through the mounting plate it is not necessary to provide supplementary openings in the tank, thus ensuring a better impermeability of the tank. Another important advantage is the abolition of manual assembly operations after blow-molding. Such operations are often carried out "blind" because a connection, e.g., of the "Quick Connect" type, must be made between the component in the tank and the outlet of the tank.

According to the invention, the communication component is installed, after having made a pocket during the pressing of the parison against the impressions, by welding at least one portion of the lateral surface of the component to at least one portion of the internal lateral surface of the pocket. Preferably, these two lateral surface portions are complementary and conical as described in application WO 2005/085660 in the name of the Applicant, the content of which is incorporated by reference in the present application. This ensures a good impermeability due to the fact that the leakage path between the component and the tank may be extended for a similar bulkiness (see FIG. 9 and the text relating thereto).

According to the invention, the formation of the pocket takes place at least partly by pressing the parison in one of the impressions of the mold provided, for this purpose, with a hollow having a shape complementary to that of the pocket.

According to one variant of the invention, the formation of the pocket is aided by the communication component itself, which is then generally pushed into the aforementioned hollow and compresses the parison at this location. In this variant, the pressing of the parison against the impressions therefore comprises the formation, by compression, of a connection section on the outer face of the tank around the communication component. The formation of such a connection section may be assisted by at least one movable part of the impression, generally located at the base of the aforementioned hollow, and which forces the material present in the hollow to take up its shape and that of said movable element at its base (which has the advantage of obtaining a section that has fixed/controlled dimensions that facilitate the connection to another element having fixed/controlled dimensions). After pressing the parison against the impressions, the movable part of the impression may be displaced to facilitate demolding of the connection section. After demolding, it is generally the end of this section that is machined in order to free the connection of the component with the outside of the tank. This variant is particularly suitable when the component is a filler neck.

It should be noted that, in this variant, the cavity preferably also comprises lateral movable parts, so as to be able to mold an external relief at the head of the neck while still allowing it to be demolded. Such a relief may be used to facilitate the connection of a sealing connector between the neck and a fill pipe. It is therefore preferably a relief of annular shape, also referred to as a sealing ring in the remainder of this application.

One alternative to this variant consists in molding a "straight" connection section (without a sealing relief) and in positioning in/around the connection of the component with the outside (once this connection is freed by machining) a part bearing such a relief.

According to the invention, the component is installed in a pocket comprising a bottom and side walls, the cross section of the pocket preferably narrowing in the direction of the bottom of the pocket, thus forming conical side walls and the communication component preferably comprises sides that are bevelled so as to be complementary to the side walls of the pocket.

When the communication component is a mounting plate, it is advantageously arranged at a certain distance from the bottom of the pocket, so that it does not stick to the bottom of the pocket, which would make machining difficult.

According to one embodiment, the process according to the invention comprises the following steps:
  installation of the communication component on a first inner wall of the parison as explained above;
  installation of a supplementary component on a second inner wall of the parison; and
  during the final molding, connection of the communication component to the supplementary component.

Within this context, it should be noted that the communication component and/or the supplementary component may be part of a components unit, several components thus possibly being connected together during the final molding. Preferably, the supplementary component comprises at least one surface made from a material that is compatible with that of the parison so that it is installed (fastened) therein (thereto) by welding. In particular, when it is based on a material that is not compatible with that of the tank, it may also be fastened thereto by rivet punching.

Just like for the communication component, the surface portion that is compatible with (weldable to) that of the tank may be a single part with the rest of the component (which is therefore entirely compatible with the tank) or may be added to the rest of the component (for example by overmolding, bonding, etc.). Such an added surface is what is referred to as a binder in the appended figures, the purpose of which is to describe certain specific variants of the invention without reducing the scope thereof.

Generally, the installation of the component on the inner wall of the parison is carried out using at least one device that is firmly attached to the core: see the aforementioned applications in the name of the Applicant, the content of which is for this purpose incorporated by reference into the present application.

The base cycles of the process according to the invention are, for example, described in application EP 1 110 697, the content of which is for this purpose introduced by reference into the present application.

FIG. 1 shows a fuel tank 10 after final molding of a parison by a process according to the invention. The fuel tank 10 comprises a skin 12 of the tank and, inside the tank 10, a components unit 14 which was, according to the present invention, assembled previously and comprises a plurality of components, including at least one mounting plate 16. The mounting plate 16 constitutes a communication component intended to permit communication between the inside and the outside of the fuel tank 10. The components unit 14 illustrated in FIG. 1 also comprises two ventilation valves 18, 18', a pump 20 and a gauge 22. The two ventilation valves 18, 18' are connected to the mounting plate 16 by ventilation lines 24, 24'. A pipe 26 for supplying an engine (not represented) with fuel connects the pump 20 to the mounting plate 16 and electrical conductors 28 connect the pump 20 and the gauge 22 to the mounting plate 16. The fuel tank 10 is formed with a pocket 30 intended to receive the mounting plate 16. The pocket 30 comprises a bottom 32 and side walls 34. The cross section of the pocket 30 narrows in the direction of the bottom 32 of the pocket 30, thus forming conical side walls 34. The mounting plate 16 comprises an outer face 36, an inner face 38, and sides 40 that are bevelled so as to be complementary to the side walls 34 of the pocket 30. Moreover, the mounting plate 16 is arranged at a certain distance from the bottom 32 of the pocket 30, which facilitates the machining of the upper part of the pocket, the result of which is illustrated in FIG. 2.

Figure 2:
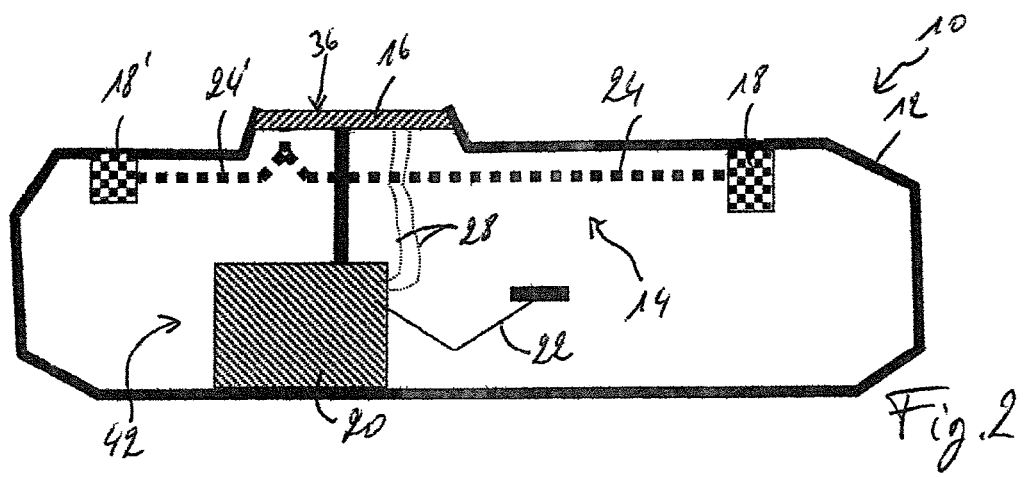
FIG. 2 illustrates a schematic cross-sectional view through the tank from FIG. 1, after cutting.
Figure 3:
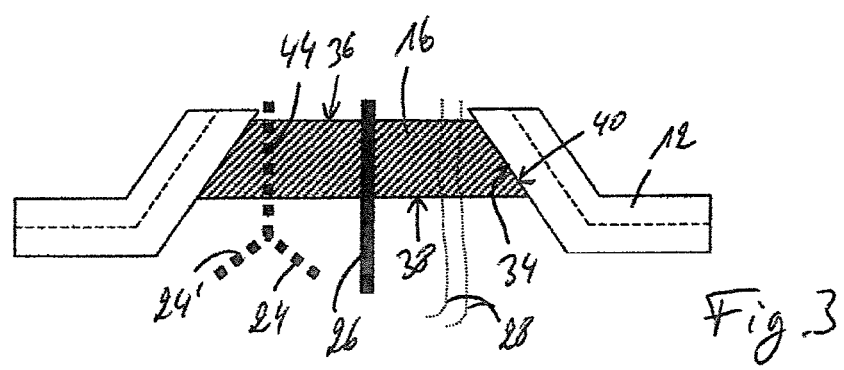
FIG. 3 illustrates a schematic cross-sectional view through the mounting plate of the components unit from FIG. 2.

FIG. 2 in fact shows the fuel tank 10 from FIG. 1, after cutting the skin 12 of the tank at the pocket 30. This cutting operation makes it possible to expose the outer face 36 of the mounting plate 16, and thus gives access to the connections of the mounting plate 16. An enlarged view of the tank at the mounting plate 16 is illustrated in FIG. 3. The conical side walls 34 of the pocket 30 and the bevelled sides 40 of the mounting plate 16 form an extended leakage path, thus minimizing the probability of a leak at the interface between the skin 12 of the tank and the mounting plate 16 while limiting the bulkiness of the assembly: see FIG. 9 which illustrates, for identical leakage path and identical mounting plate working diameter, the increase in bulkiness with a conical weld edge relative to a "flat" weld edge. In this figure, 1 represents a mounting plate, 2 the wall of the tank and 3 a binder or surface portion of the mounting plate compatible with the wall of the tank (the rest of the mounting plate not being compatible).

The skin 12 of the tank which is illustrated therein is constituted of one layer of thermoplastic material (HDPE for example) and of one supplementary layer made from a barrier material to liquids and/or gases so as to limit as much as possible the permeability of the liquids and gases in contact with the internal surface of the tank. The mounting plate 16 is also made from a material that is impermeable to liquids and gases (polyamide (PA) or polyoxymethylene (POM) for example).

According to one embodiment, the pump 20 and the gauge 22 are installed separately from the ventilation valves 18, 18' and from the mounting plate 16. Specifically, the ventilation valves 18, 18' and the mounting plate 16 form a components unit 14, which is installed on an upper first internal wall of the parison. The pump 20 and the gauge 22 form a pumping module 42, which is installed on a lower second internal wall of the parison. The components unit 14 and the pumping module 42 are arranged and configured so that, during the final molding of the tank, the pumping module 42 is connected to the components unit 14, for example by means of a connector (not represented). Two elements may for example slide inside one another and/or form what is known as a "quick connect". One of the elements may comprise a conical portion to facilitate the connection during the final molding of the tank.

FIG. 3 also shows the connections of the mounting plate 16. Thus, a ventilation line 44, connected to the ventilation lines 24, 24', passes through the mounting plate 16 from its inner face 38 to its outer face 36. The pipe 26 for supplying an engine with fuel, which is connected to the pump 20, also passes through the mounting plate 16. Finally, the mounting plate 16 also comprises a passage for the electrical conductors 28 that feed the pump 20 and the gauge 22 and/or cables that make it possible to pass signals between these components and an external control unit (not represented). The outer face 36 of the mounting plate 16 is configured for and comprises means for enabling cables and pipes to be connected to the respective terminals of the mounting plate 16.

Figure 4:
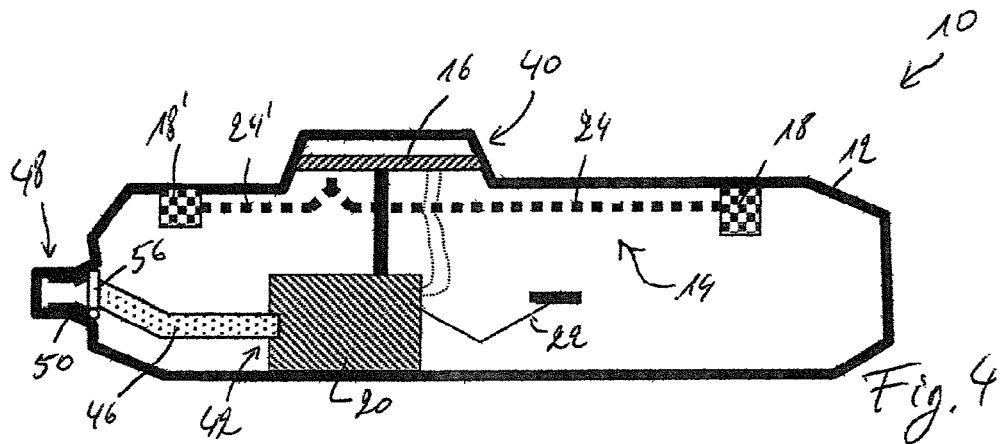
FIG. 4 illustrates a schematic cross-sectional view through a fuel tank resulting from the process according to a second embodiment of the invention, before cutting.
Figure 5:
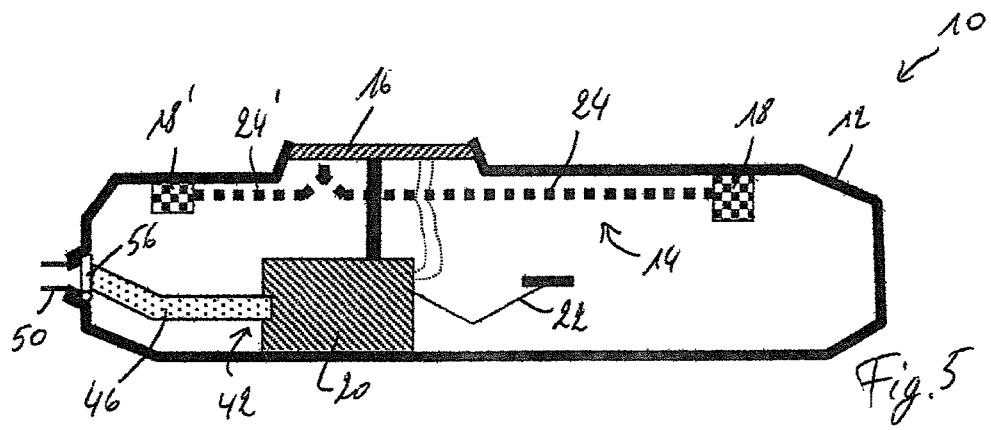
FIG. 5 illustrates a schematic cross-sectional view through the tank from FIG. 4, after cutting.

According to another embodiment of the invention illustrated in FIGS. 4 and 5, a filler tube 46 is connected to the pumping module 42. The filler tube 46 extends up to the inner wall of the tank 10. The tank 10 is formed with a second pocket 48 comprising a filler neck 50 intended to receive one end of the filler tube 46. FIG. 5 shows the tank 10 after cutting the skin 12 of the tank at the second pocket 48. This cutting operation makes it possible to expose the end of the filler neck 50 and to thus form an opening in the tank 10 in order to enable it to be filled by a filling nozzle (not represented). The filler neck 50, which is represented on a larger scale in FIG. 6, comprises a first portion 52 made of high-density polyethylene and a second portion 54 made of a low permeability material. The first portion 52 is connected to the inner wall of the tank 10, preferably on a conical part in order to extend the permeability path and thus reduce the emissions of hydrocarbons between the skin 12 of the tank and the end of the filler tube 46. The first portion 52 also comprises a closure member 56 that makes it possible to close the opening to the filler tube 46. Such a closure member is generally a valve of the ICV (Inlet Check Valve) type, well known to a person skilled in the art. The arrows 58 in FIG. 6 indicate the location where the skin 12 of the tank is cut, thus exposing the second portion 54 of the end of the filler neck 50.

Figure 6:
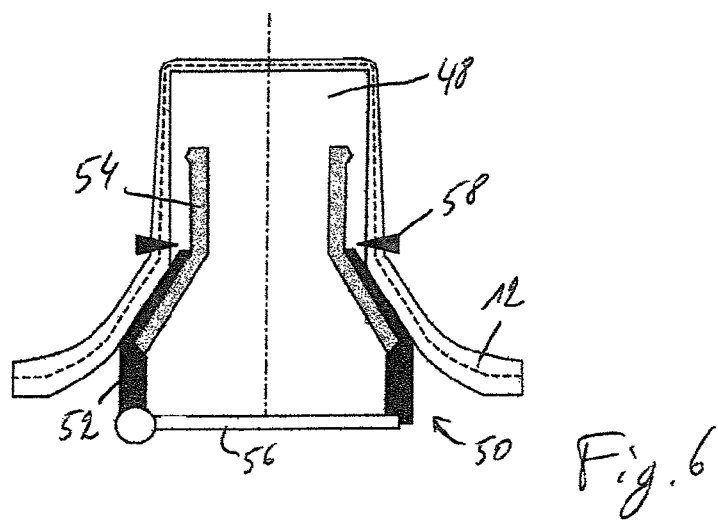
FIG. 6 illustrates a schematic cross-sectional view through a filler neck according to one embodiment of the invention.

The filler neck 50 of FIG. 6 constitutes a communication component within the meaning of the present invention, this communication component being intended to permit communication between the inside and the outside of the fuel tank 10. The filler neck 50 may be connected to a components unit 42, as illustrated in FIGS. 4 and 5. The filler neck 50 may however also be installed as an independent element not directly connected to another component installed in the fuel tank.

Figure 7:
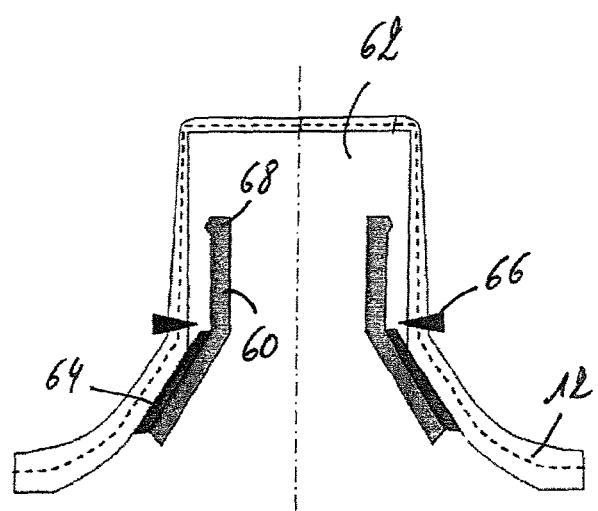
FIG. 7 illustrates a schematic cross-sectional view through a ventilation line according to one embodiment of the invention.

FIG. 7 illustrates a ventilation line 60 installed in a third pocket 62 (not visible in FIGS. 1 to 5). A binder 64 is positioned between the inner face of the skin 12 of the tank and the outer face of the ventilation line 60. The arrows 66 in FIG. 7 indicate the location where the skin 12 of the tank is cut, thus exposing one connection end 68 of the ventilation line 60.

FIG. 8 (FIG. 8.1, 8.2, 8.3, 8.4) illustrates 5 steps of a process according to one variant of the invention during which a filler neck 50 is fastened to a tank, said neck comprising, at least at the surface, a material that is compatible with that of the skin 12 of the tank and, at its end opposite the fill opening, an ICV 56 as described above. Compared to the variant illustrated in FIG. 6, this offers, as an advantage, the fact that the neck may be entirely based on HDPE.

In a first step of the process (not illustrated), the skin 12 of the tank is pressed against the impressions of a mold 70 comprising a cavity 71 in which there are movable parts 72, 73 so that a pocket 30 is formed in said cavity 71.

In a second step of the process (FIG. 8.1), a support 81 firmly attached to a core 80, which is movable relative to this support (for example by virtue of a hydraulic actuator, not represented), and which bears the neck 50, pushes said neck into the pocket 30 and fastens it thereto by welding.

In a $3^{rd}$ step (FIG. 8.2), the movable part 72 compresses the material of the skin 12 against the end of the neck 50, in order to mold thereto, by compression, a connection section having fixed/controlled dimensions.

In a $4^{th}$ step (FIG. 8.3), the movable parts 72, 73 and 81 retract and the core 80 is withdrawn from the mold in order to enable the final blow-molding of the tank (after closure of the mold, in a step that is not represented).

The molded and at least partly cooled tank is then demolded.

Lastly, a final step (FIG. 8.4) consists in cutting the portion indicated by an arrow so as to clear an opening for the passage of the fuel. It should be noted that this opening is surrounded by a sealing ring 12' as defined previously and which has therefore been molded by virtue of the lateral movable parts 73.

In the case of an ICV that has, as a closure member, a simple swinging plate, one variant that is also suitable, and which is more advantageous in terms of cost, is that illustrated schematically in FIG. 10.1. In this figure, the neck 50 does not comprise a base and it has been installed using a mandrel, firmly attached to the core, onto which said neck 50 was slipped (alternative to the part 81 from FIG. 8, not represented) and which was withdrawn once the welding was carried out. This variant, which has the advantage of having to machine less material, is not however suitable with ICVs, the closure member of which cannot be disengaged in order to allow the passage of the mandrel (cf. for example "torpedo" ICVs). To facilitate the comparison between this variant and that of FIG. 8, a similar schematic diagram of the variant of FIG. 8 is represented in FIG. 10.2.

The variants illustrated in FIGS. 8 and 10 have one drawback: the fact that the sealing ring comprises a parting line (i.e., a protuberance at the location of the junction of the mold impressions). This protuberance can generally be minimized using typical molding tolerances. In the event that this is not acceptable, this protuberance is preferably machined to avoid sealing problems when a sealing connector (or another part) is fastened thereto.

To avoid this machining, one variant which is illustrated in FIG. 11 consists in not molding a sealing ring (which simplifies the mold also, since the movable parts 73 can be omitted) but in clipping, after machining (as illustrated by the lines in FIG. 11.1), an added part 55 (visible in FIG. 11.2) that comprises such a ring and that is, for example, injection-molded and that does not comprise a parting line. This variant also has, as an advantage, the fact that the length of the compression-molded section can be reduced (having identical geometry) so that the thickness of said section is greater and the molding thereof is easier. However it has, as a drawback, the use of an additional part which generates a cost and a supplementary assembly operation.

As regards FIG. 11.2, it should be noted that:
it does not exactly represent the equivalent of FIG. 11.1 in the sense that the neck is extended downwards, which is generally the case in practice in order to be able to house the ICV therein;
the added part 55 is in fact hollow and the portion in bold in fact represents the void.

The variant illustrated in FIGS. 12 to 15 is that described previously, according to which the formation of the pocket is aided by the communication component itself, which is then generally pushed into the aforementioned hollow and compresses the parison at this location.

Figure 12:
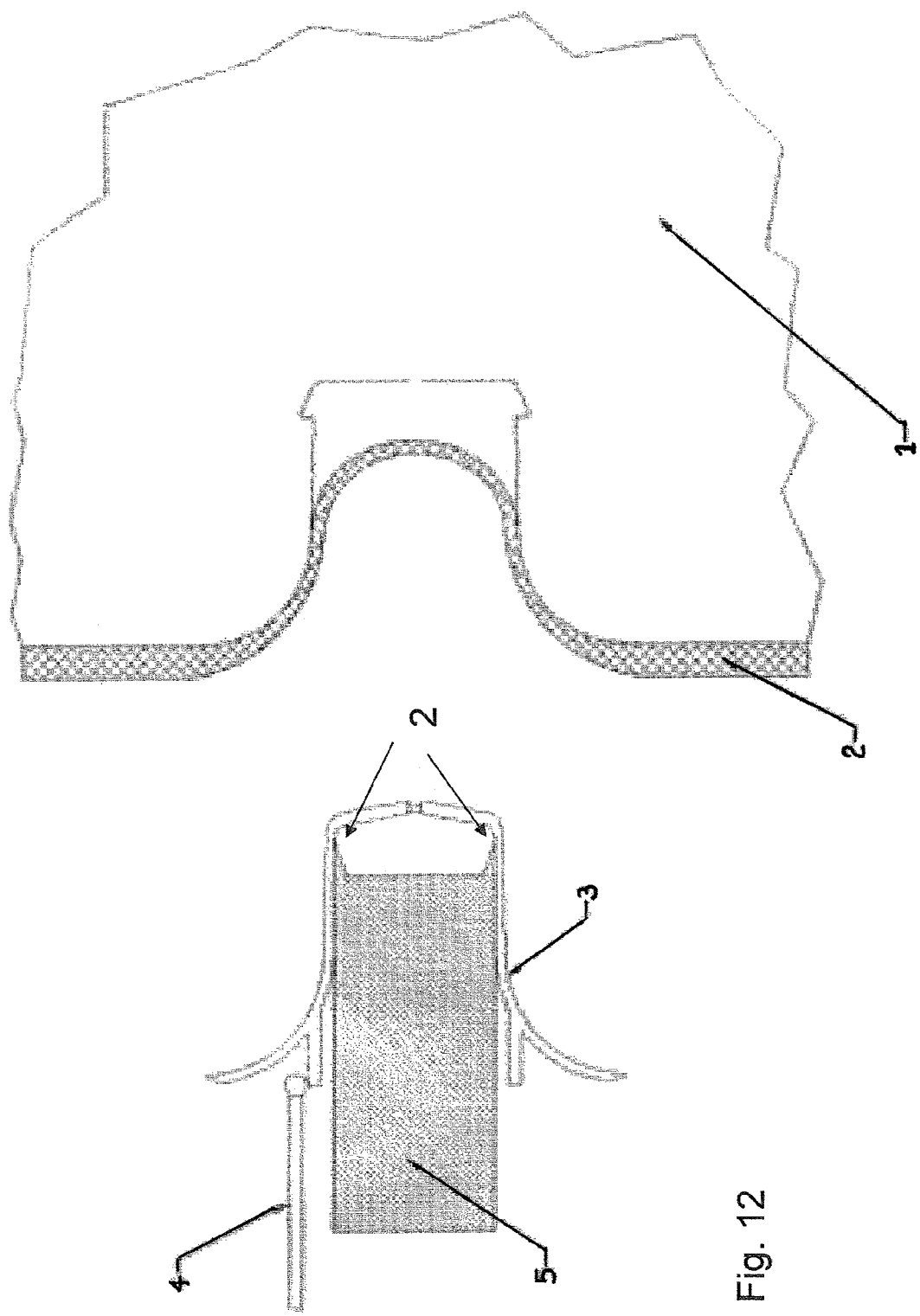
FIGS. 12 to 15 illustrate a schematic view of four steps of a process according to yet another variant of the invention.

In FIG. 12, it is possible to see how the tank wall (2) partly adopts a relief present in the impression of the mold (1) in order to constitute a pocket, introduced into which will be a filler neck (3) comprising an ICV (Inlet Check Valve) or valve comprising a swinging closure member (4) which, by default, is compressed by a spring against a seal (not represented) positioned on the perimeter of the end of the neck (3). The neck (3) will be introduced into the pocket using a movable support (5) firmly attached to the core (not represented) and that comprises a blade (2).

Figure 13:
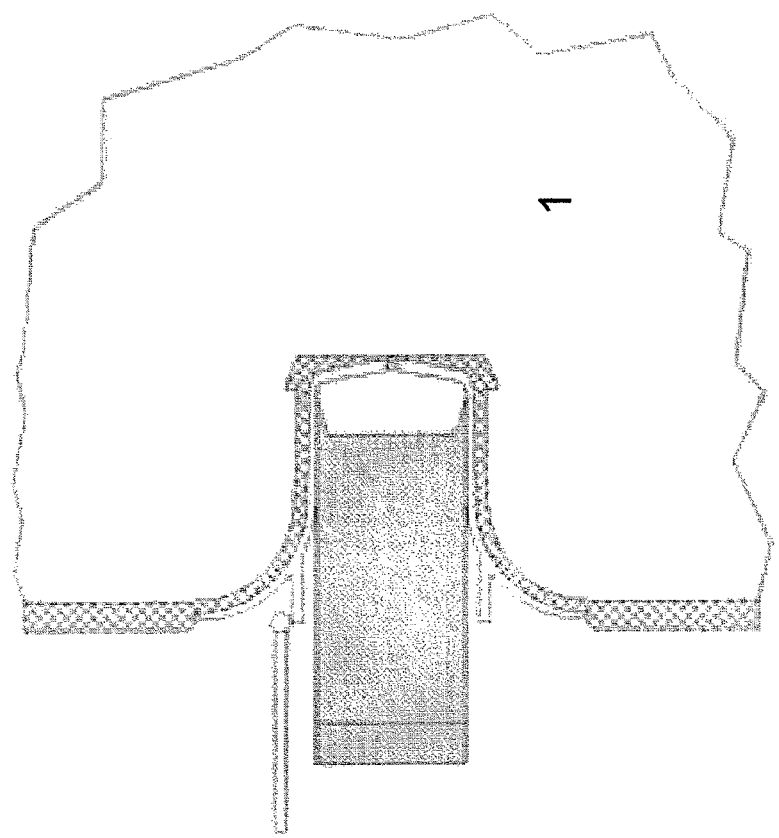

In FIG. 13, it is possible to see how the assembly (neck (3), closure member (4) and support (5)) assist the molding (by compression) of the pocket and, at the same time, fasten the neck (3) thereto.

Figure 14:
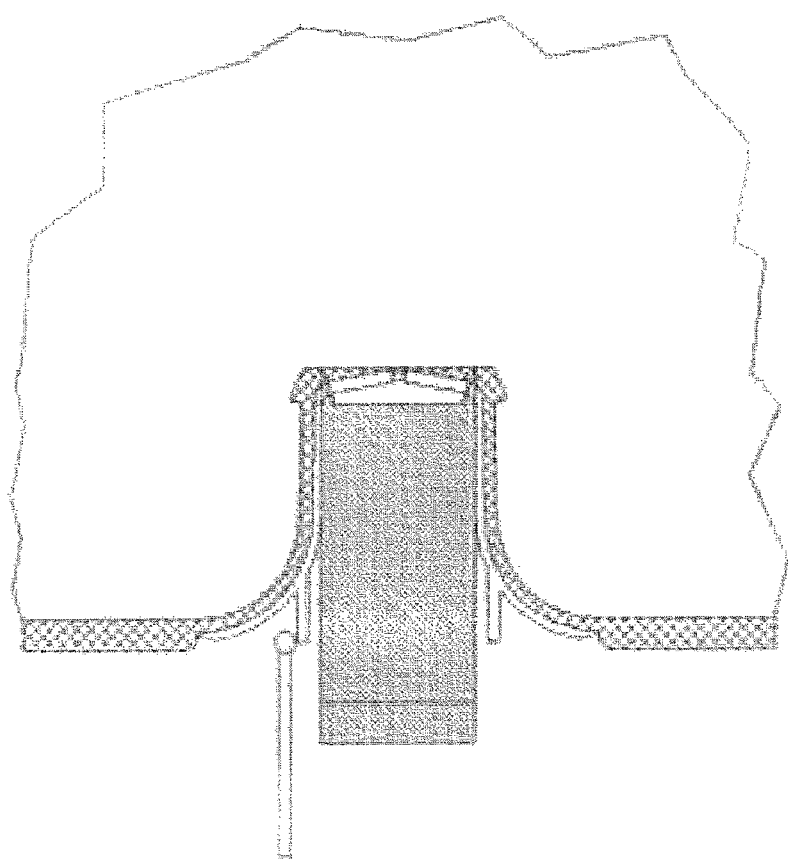

In FIG. 14, the following step is seen where the blade (2) has been advanced so as to cut both the head of the neck (3) and the portion of the parison that it covers.

Figure 15:
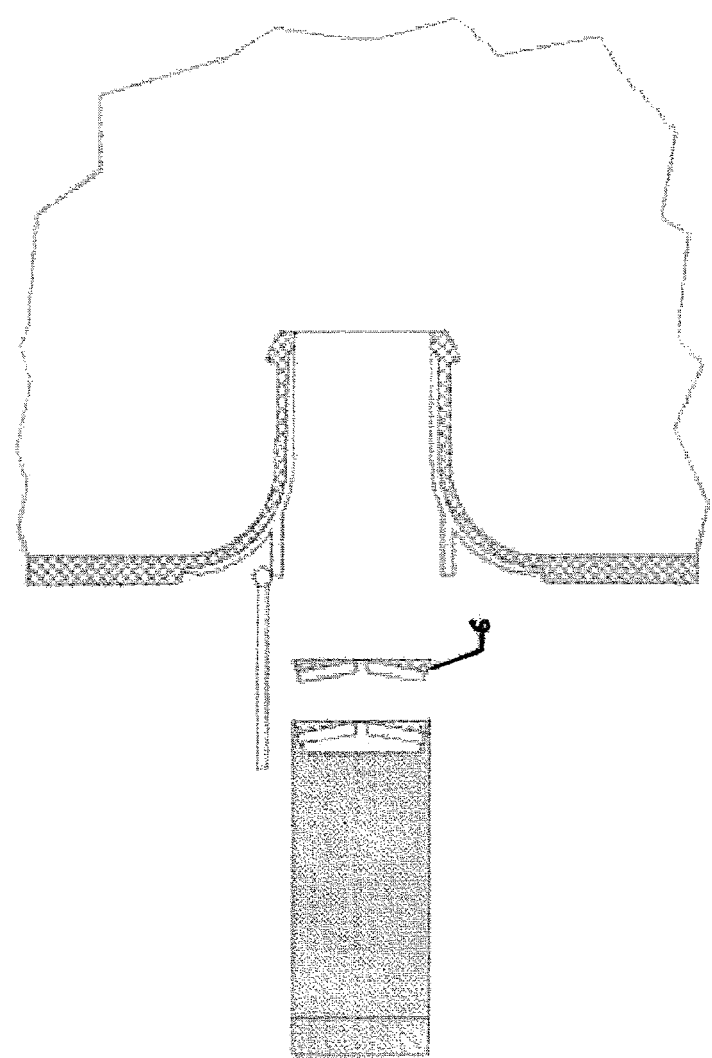

Finally, seen in FIG. 15 is the withdrawal of the support (5) and of its blade (2), which is accompanied by the withdrawal of the cut off material (6). This material just has to be removed from the support/blade in order to reuse the assembly in a process according to the invention.

It should be noted that, in this variant, during the final blow-molding of the tank (second closure of the mold), blow-molding air may infiltrate between the mold (1) and the outer surface of the parison if the orifice created by the blade is not filled. Hence, according to one advantageous subvariant, the mold comprises a portion that is movable level with the pocket, the shape and dimensions of which are such that it can be pushed into the head of the neck and the sealing can thus be obtained.

According to another variant, which is not illustrated, the blade (2) is only partially pushed into the parison in the step in FIG. 14, so as to only make a precut, the final cut (for piercing the neck) being made after demolding the tank, in a finishing step. The advantage of this variant is in not needing to use a movable part as described above in order to obtain the sealing.

However, when the support (5) is withdrawn for the final molding, a "closed" cavity is formed in the neck once the closure member closes by default. This results in a pressure difference being created during the blow-molding, which will deform (crush) the seal, or even damage it.

Hence, according to one particularly advantageous variant, the neck has a design that makes it possible to avoid this, for example: a groove in which the seal is housed and which has a height such that the deformation of the seal is limited. Any other type of mechanical stop may of course also be suitable.

The invention claimed is:
1. A process for manufacturing a plastic fuel tank equipped with at least one communication component intended to communicate with an outside of the tank and which has a side wall, by molding a parison using a mold comprising two impressions and a core, said process comprising the following steps:

introduction of a parison into the mold impressions;

introduction of a core inside the parison, said core having first been fitted with the at least one communication component;

closure of the mold so that the impressions come into leaktight contact with the core;

pressing of the parison against the impressions by blowing through the core and/or applying a vacuum behind the impressions;

installation of the at least one communication component on an inner wall of the parison;

opening of the mold in order to withdraw the core;

final molding of the parison by blow molding and/or thermoforming; and cutting the skin of the tank so as to allow access to the communication component, wherein:

the mold impressions are provided with a hollow which, when pressing the parison against said impressions, gives rise, at least partly, to the formation of a pocket having a shape complementary to that of the hollow and comprising a bottom and a side wall; and the installation of the communication component comprises its fastening, in this pocket, by welding of at least one portion of its side wall to at least one portion of the side wall of the pocket.

2. The process according to claim 1, wherein the communication component comprises a filler neck, a ventilation pipe, an OBD line, an electrical connector or a mounting plate.

3. The process according to claim 2, wherein the communication component comprises a mounting plate, and wherein the mounting plate is part of a previously assembled components unit that comprises a plurality of components.

4. The process according to claim 3, wherein the components of the components unit are selected from the group consisting of a pump, a gauge, and a ventilation system.

5. The process according to claim 4, wherein the mounting plate comprises:

a ventilation passage connected to the ventilation system; and/or a fuel passage connected to the pump; and/or a passage for electrical conductors connected to the pump and/or the gauge.

6. The process according to claim 1, wherein lateral surface portions of the communication component and of the pocket are complementary and conical.

7. The process according to claim 1, wherein the pressing of the parison against the impressions comprises formation of a connection section on an outer face of the tank around the communication component, by compression of material in the hollow of the mold with aid of the communication component.

8. The process according to claim 7, wherein the formation of the connection section by compression is assisted by at least one movable part of the impression.

9. The process according to claim 7, wherein the connection section is provided with a sealing ring which is either molded as a single part with it by virtue of the lateral movable parts in the cavity, or is part of a separate part that is positioned in/around the connection of the communication component once this connection is freed.

10. The process according to claim 7, wherein the communication component is a filler neck, and wherein an end of the connection section is machined/cut in order to free the connection of the communication component with the outside of the tank.

11. The process according to claim 1, wherein the communication component is a mounting plate arranged at a distance from the bottom of the pocket.

12. The process according to claim 1, comprising the following steps:

installation of the communication component on a first inner wall of the parison;

installation of a supplementary component on a second inner wall of the parison; and during the final molding, connection of the communication component to the supplementary component.

13. The process according to claim 12, wherein the supplementary component is installed by welding or by rivet punching.

14. The process according to claim 1, wherein the welding of the at least one communication component takes place using a binder.

15. The process according to claim 1, wherein the installation of the at least one communication component on the inner wall of the parison is carried out using at least one device that is firmly attached to the core.

* * * * *